J. H. HOWARD.
MACHINE FOR PACKAGING MATERIALS.
APPLICATION FILED AUG. 2, 1905.
933,839.
Patented Sept. 14, 1909.
10 SHEETS—SHEET 1.
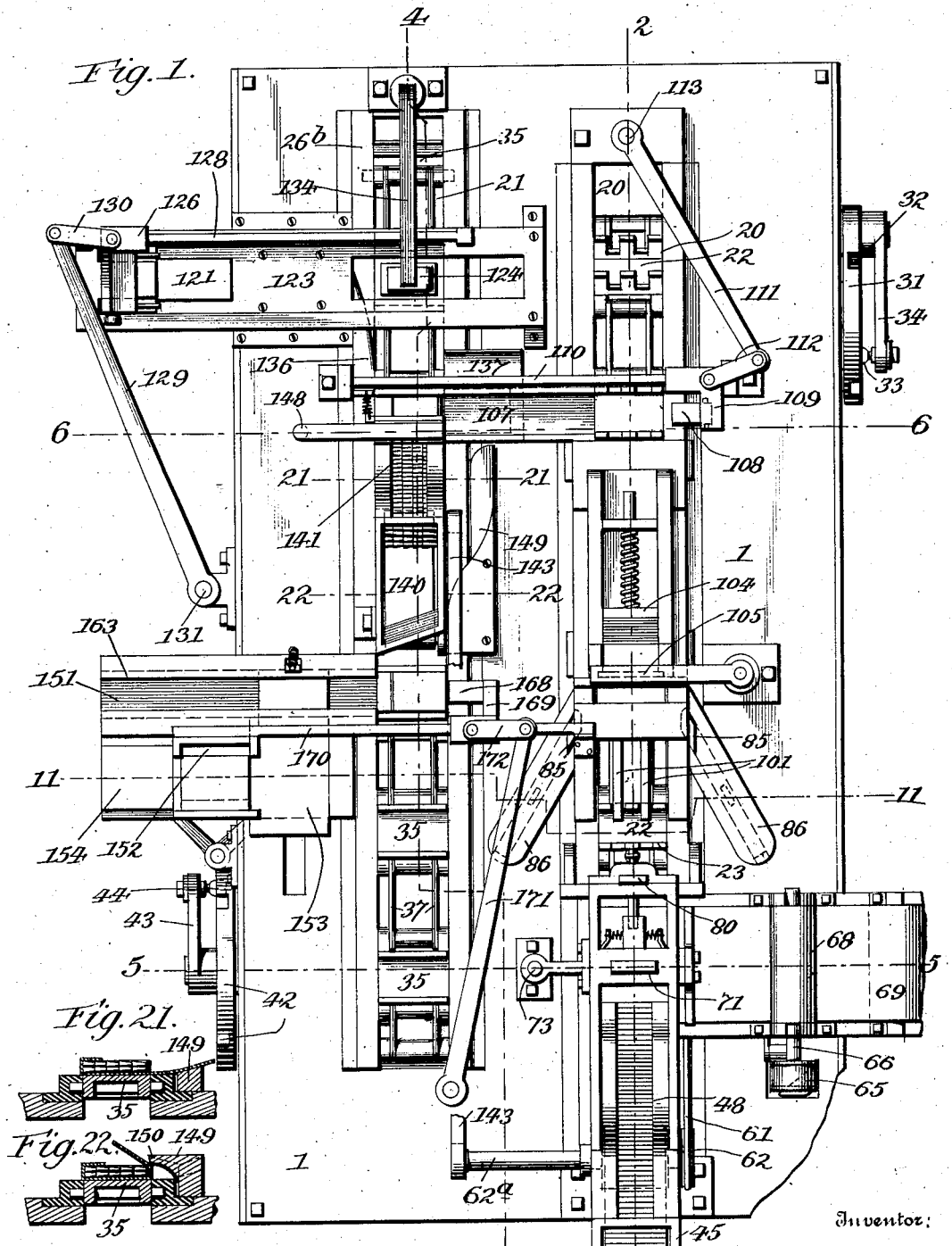
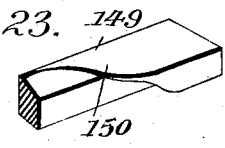

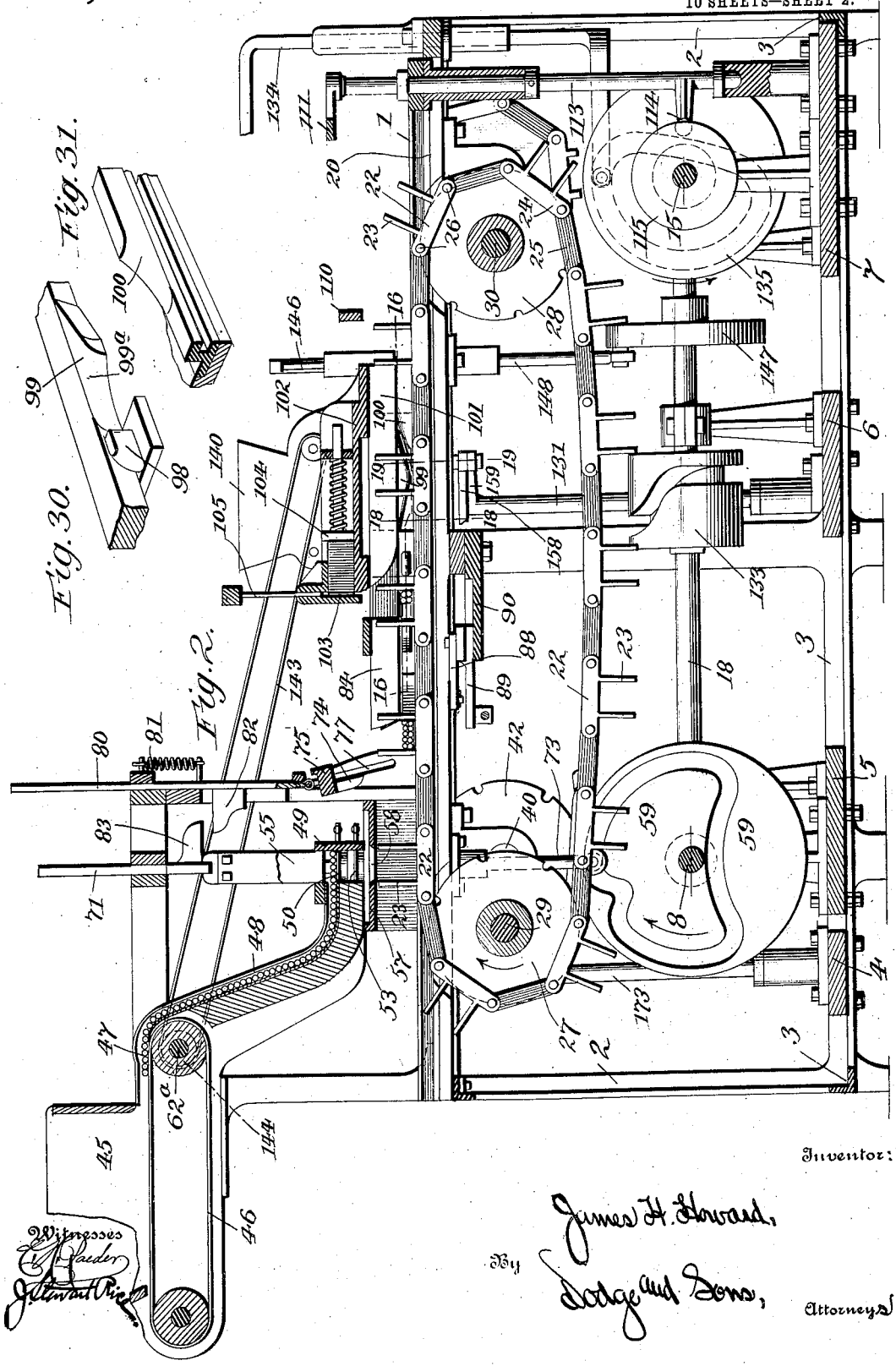

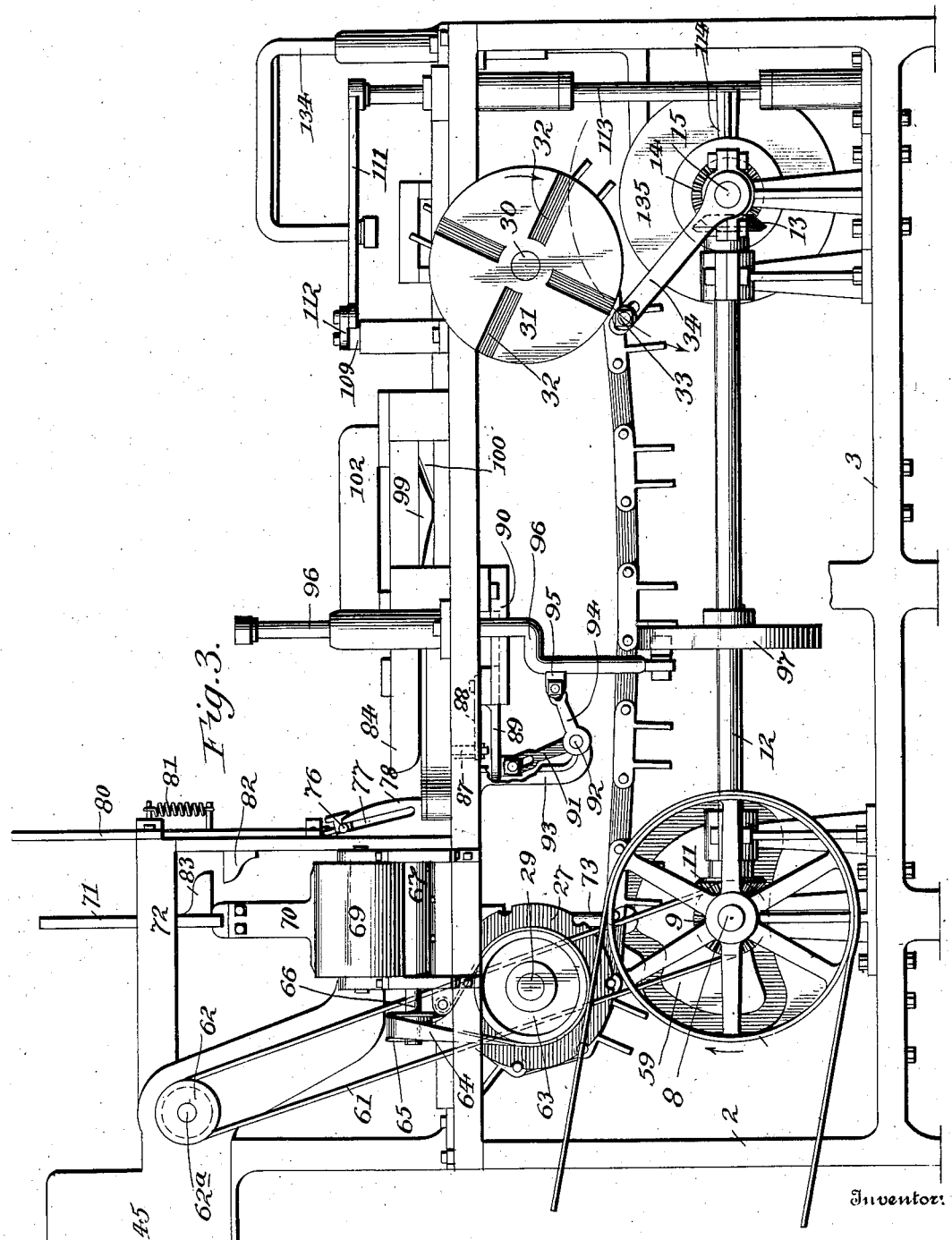

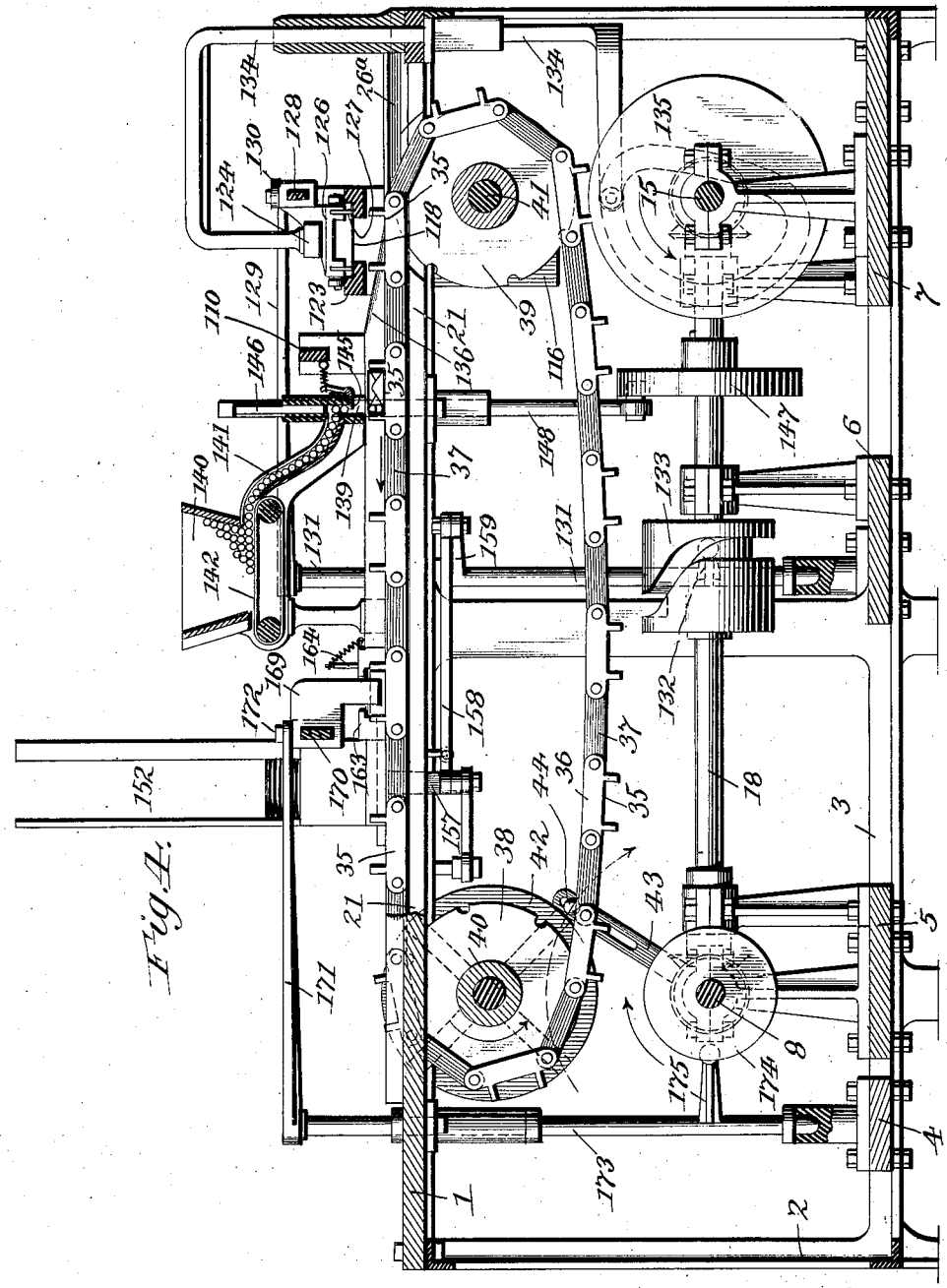

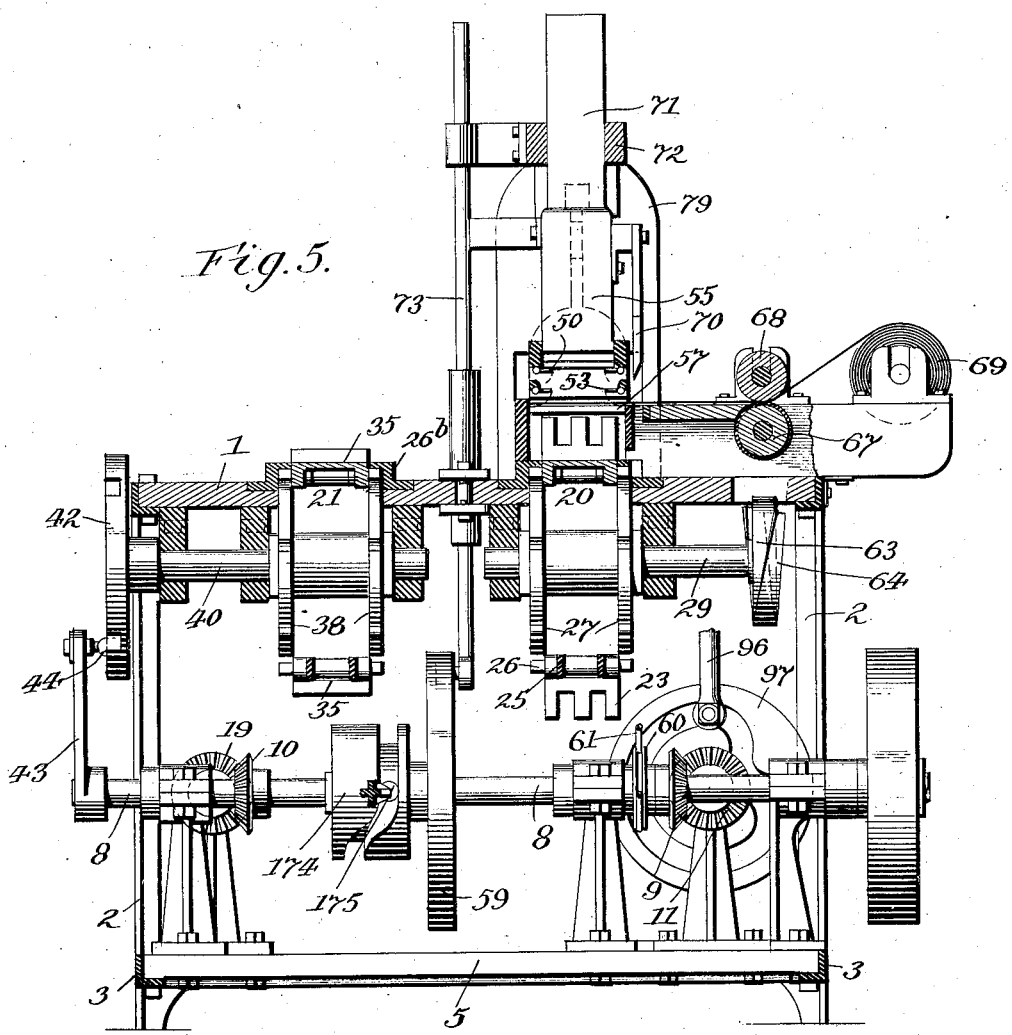

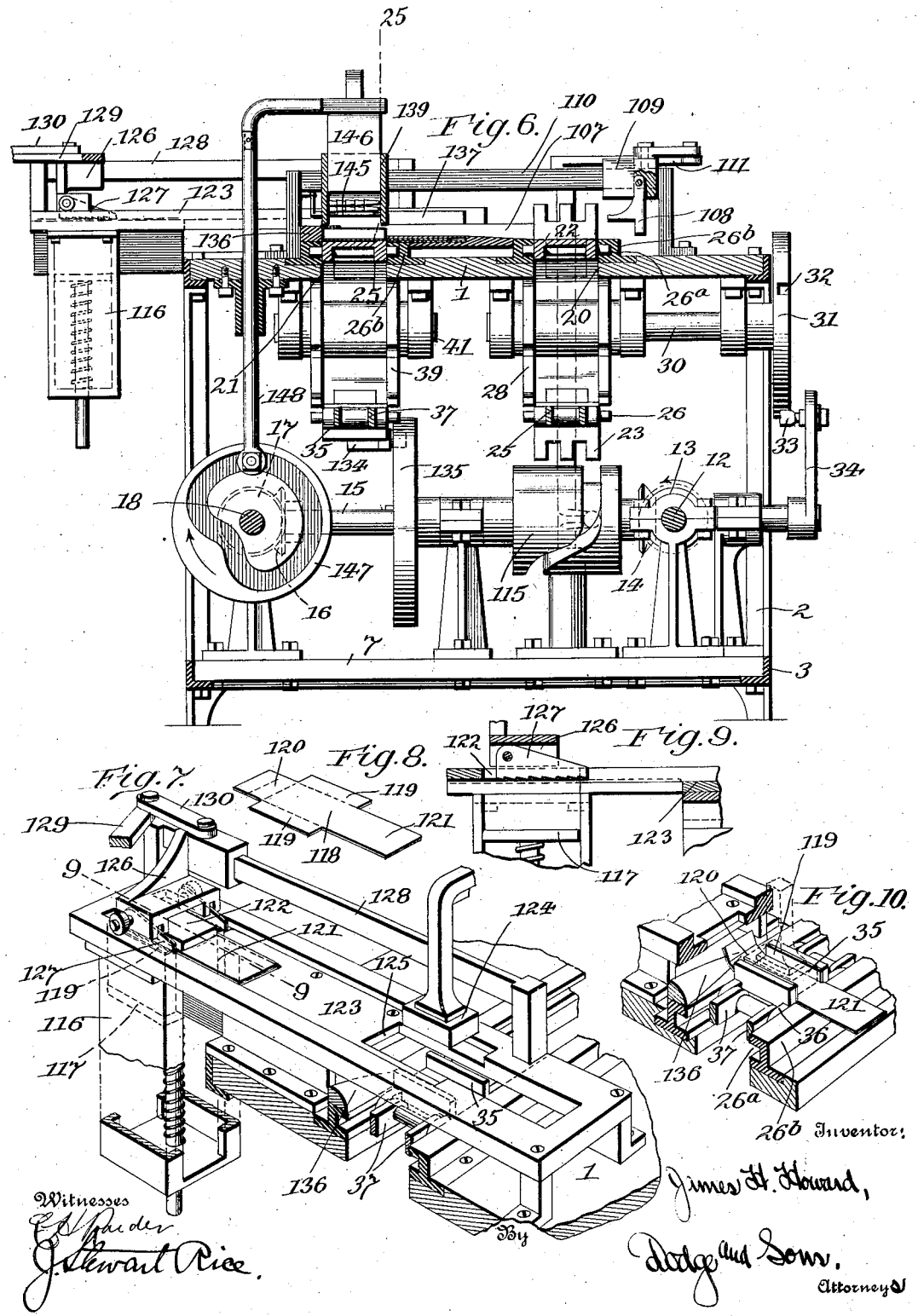

J. H. HOWARD.
MACHINE FOR PACKAGING MATERIALS.
APPLICATION FILED AUG. 2, 1905.
933,839.
Patented Sept. 14, 1909.
10 SHEETS—SHEET 7.
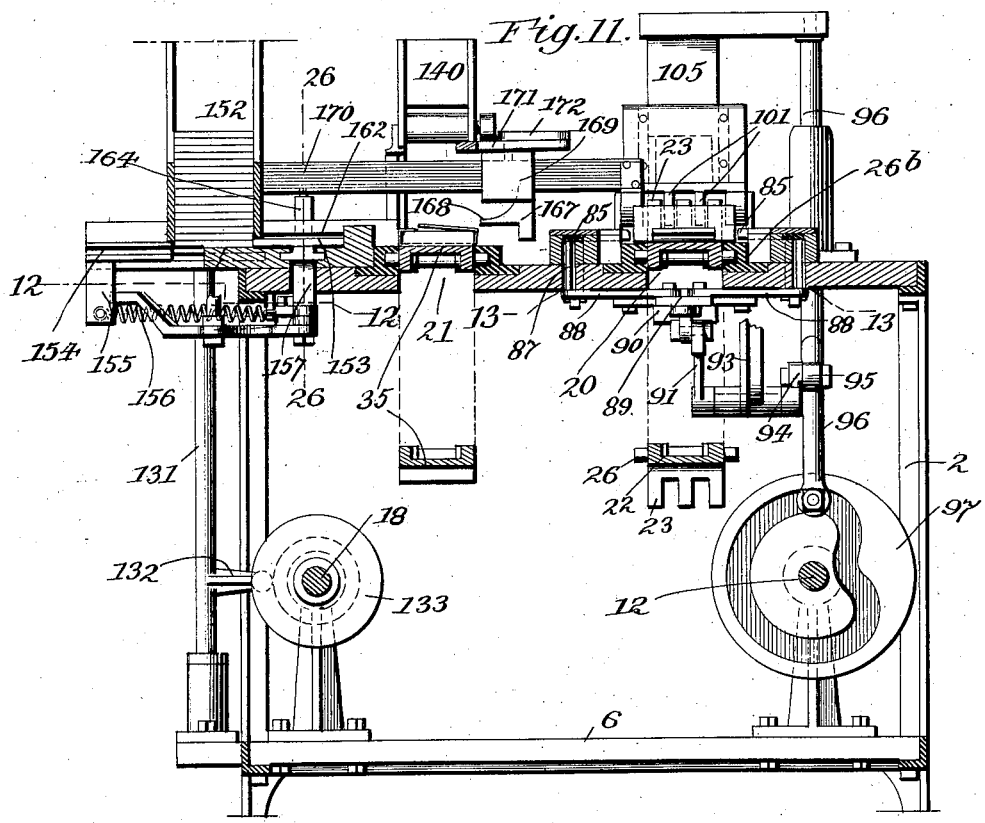
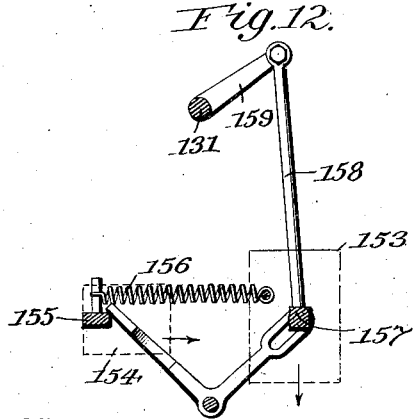
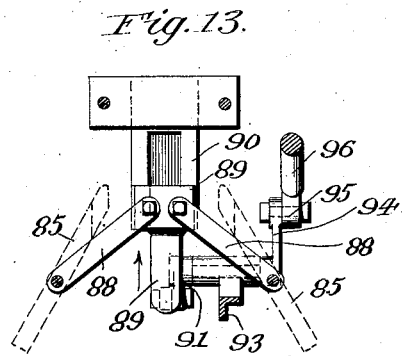

J. H. HOWARD.
MACHINE FOR PACKAGING MATERIALS.
APPLICATION FILED AUG. 2, 1905.
933,839.
Patented Sept. 14, 1909.
10 SHEETS—SHEET 8.
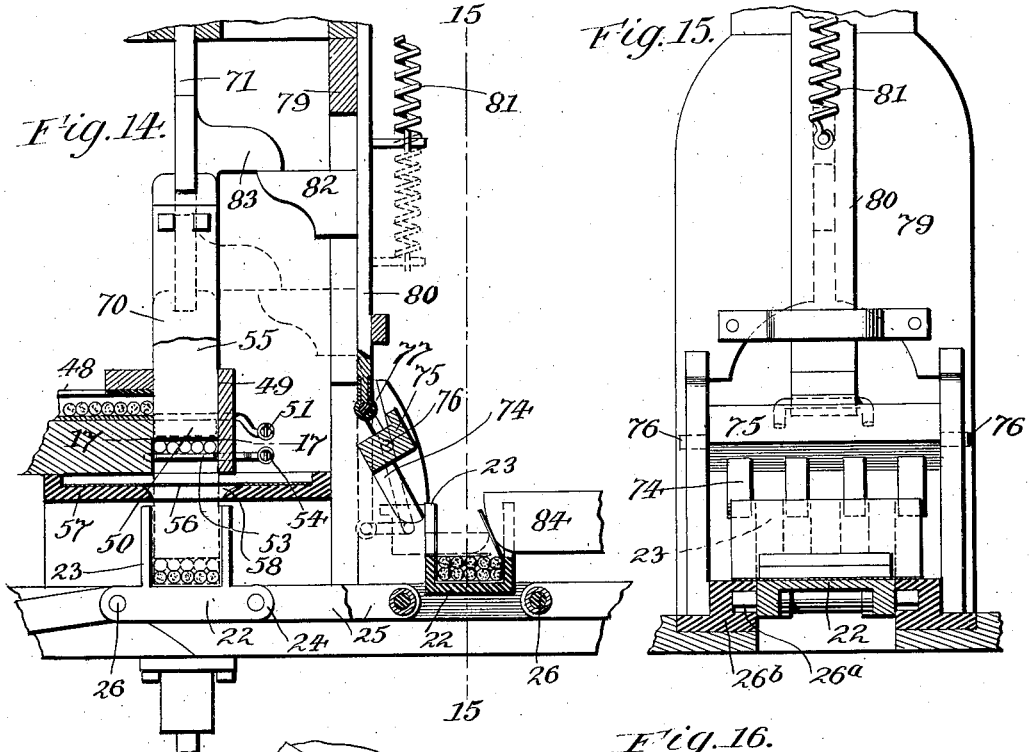
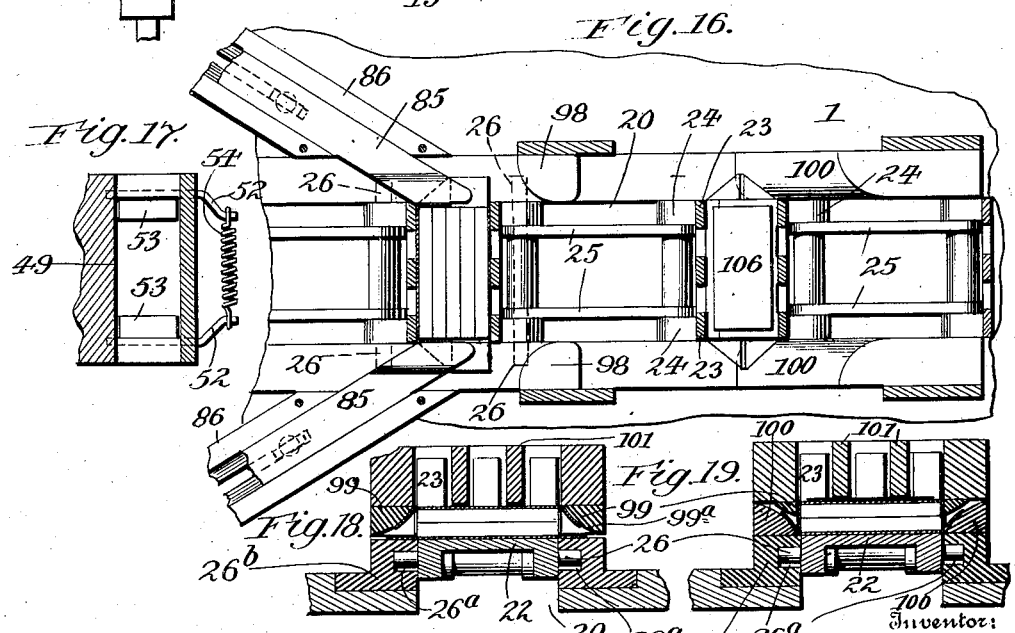

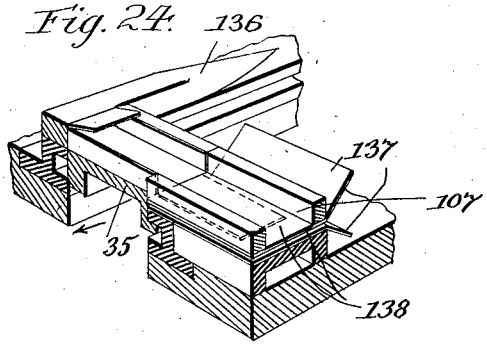
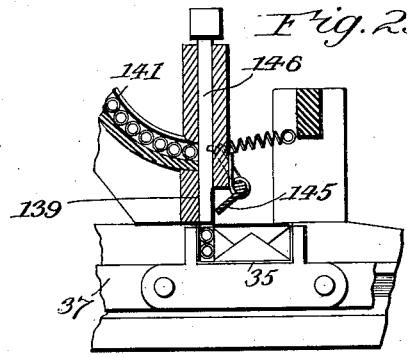
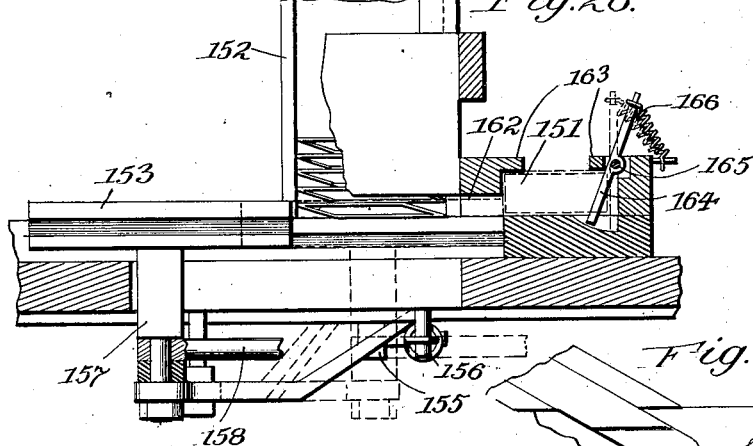
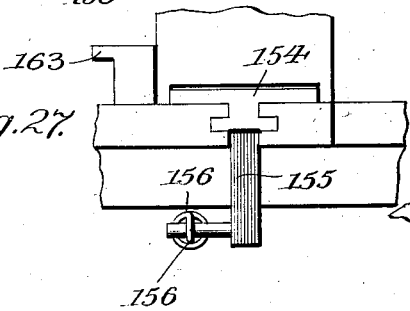
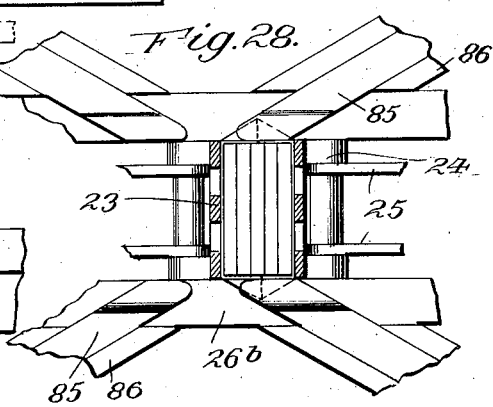

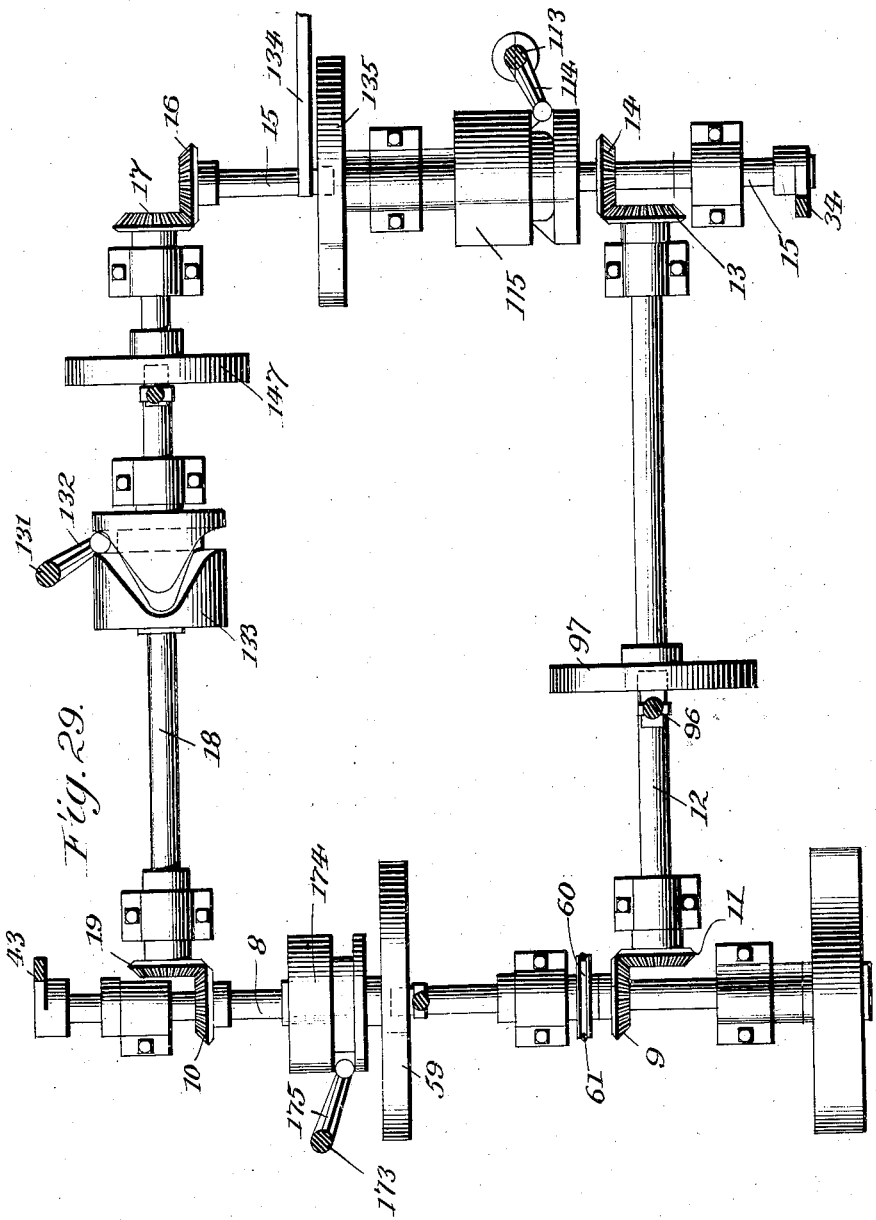

UNITED STATES PATENT OFFICE.

JAMES H. HOWARD, OF DURHAM, NORTH CAROLINA, ASSIGNOR TO THE AMERICAN TOBACCO COMPANY, A CORPORATION OF NEW JERSEY.

MACHINE FOR PACKAGING MATERIALS.

933,839. Specification of Letters Patent. Patented Sept. 14, 1909.

Application filed August 2, 1905. Serial No. 272,337.

To all whom it may concern:

Be it known that I, JAMES H. HOWARD, a citizen of the United States, residing at Durham, in the county of Durham and State of North Carolina, have invented certain new and useful Improvements in Machines for Packaging Materials, of which the following is a specification.

My present invention pertains to improvements in machines for packaging cigarettes, the apparatus being designed to automatically place a predetermined number of cigarettes within a combined foil and paper wrapper, to completely envelop or inclose said cigarettes within the wrapper, to place a card or the like upon the package thus formed, to insert the package and card in the box-slide, to put a number of mouth-pieces in said slide, to thereafter completely fold the slide about its contents, to open a shuck, and to move the slide and its contents within the shuck.

The invention will be best understood upon reference to the annexed drawings, wherein:

Figure 1 is a top plan view of the machine; Fig. 2 a longitudinal sectional view on the line 2—2 of Fig. 1, the parts in the rear being omitted for the sake of clearness; Fig. 3 a side elevation of the machine, certain portions being omitted in order to avoid confusion in the drawings; Fig. 4 a longitudinal sectional view on the line 4—4 of Fig. 1; Fig. 5 a transverse sectional view on the line 5—5 of Fig. 1, portions in the rear or at the opposite end of the machine being omitted; Fig. 6 a transverse sectional view on the line 6—6 of Fig. 1; Fig. 7 a detail perspective view of the magazine for holding the box-slides, the mechanism for feeding said slides and the plunger which places the slides upon the traversing belt or chain; Fig. 8 a perspective view of one of the slides in its flattened condition; Fig. 9 a longitudinal sectional view on the line 9—9 of Fig. 7; Fig. 10 a detail perspective view of a portion of one of the transfer chains or carriers, showing a box-slide placed within one of the holders on said chain or carrier and partially folded or squared; Fig. 11 a transverse vertical sectional view on the line 11—11 of Fig. 1; Fig. 12 a horizontal sectional view on the line 12—12 of Fig. 11, showing the mechanism for withdrawing the collapsed shucks from the magazine and the slide for opening said shucks preparatory to the box-slide and its contents being moved endwise into the same; Fig. 13 a horizontal sectional view on the line 13—13 of Fig. 11 illustrating the folder mechanism employed to form the initial end folds upon the cigarette package; Fig. 14 an enlarged detail vertical sectional view of the forward or head end of the machine shown at the right of Fig. 2 and illustrating the mechanism employed for withdrawing the cigarettes from the supply hopper and placing them within the wrapper and also the mechanism for forming the initial or upper folds on the package; Fig. 15 a vertical sectional view taken on the line 15—15 of Fig. 14; Fig. 16 a horizontal sectional view taken on the line 16—16 of Fig. 2; Fig. 17 a horizontal sectional view on the line 17—17 of Fig. 14, illustrating the means for holding the lower tier or layer of cigarettes which have been removed by the plunger from the runway preparatory to a second descent of the plunger which removes the upper tier from the runway and carries both layers or tiers downwardly upon the wrapper and into the pocket formed on one of the traversing chains or carriers; Fig. 18 a transverse sectional view taken on the line 18—18 of Fig. 2 and illustrating the manner of folding in the upper projecting ends of the wrapper; Fig. 19 a similar view, taken on the line 19—19 of Fig. 2, showing the folder as acting upon the lower projecting end of the wrapper; Fig. 20 a detail perspective view of one of the movable folders or end tuckers; Fig. 21 a transverse vertical sectional view on the line 21—21 of Fig. 1; Fig. 22 a similar view on the line 22—22 of Fig. 1, both of said figures illustrating the manner in which the long end of the box-slide is turned upwardly and over the contents of the slide preparatory to the slide as a whole being moved into the open shuck; Fig. 23 a detail perspective view of the folder which accomplishes the turning in of the long end of the box-slide; Fig. 24 a detail perspective view of the slide-way or channel and the means employed in conjunction therewith for holding the long end of the box-slide in such position that the wrapped cigarettes may readily move into the box-slide without damage to the wrapper; Fig. 25 a vertical sectional view, taken on the line 25—25 of Fig. 6 and illustrating the plunger mechanism for placing the mouth-pieces within the box-slide alongside of the wrapped cigarettes; Fig. 26 a vertical sectional view, taken on the line 26—26 of Fig. 11, showing the shuck hopper and the mechanism employed for opening the shucks as they are projected from said hopper; Fig. 27 a detail end elevation of the plunger and its allied parts which project the collapsed shucks from the hopper into the path of a slide which moves them against the shuck-opening device; Fig. 28 a detail horizontal sectional view, showing a modification of the means for forming the end tucks upon the package; Fig. 29 a plan view of the operative shafting and the actuating cams carried thereby; Fig. 30 a perspective view, as seen from below, of one of the fixed tucking fingers and the upper portion of one of the end folders; and Fig. 31 a perspective view of the lower portion of one of the end folders.

The main object of the present invention is to provide a relatively simple and compact machine for carrying out the operations above set forth.

The apparatus shown in the accompanying drawings and hereinafter described in detail occupies but little floor-space and is entirely automatic in its action, it being only necessary for the operator to see that the machine is provided with the necessary wrapping material, and that the supply is maintained in the feed hopper for the cigarettes, as well as in the hoppers for the mouth-pieces, the cards, slides and shucks.

Referring to the drawings, 1 designates the bed of the machine, which is supported upon suitable legs or uprights 2 which in turn are connected by channel pieces or bars 3, said bars forming supports for the cross-bars 4, 5, 6 and 7 (see Fig. 2). Said cross-bars provide a support for the brackets or arms in which the various operating shafts are mounted. Any form of structure which will afford a sufficient support for the bed and driving mechanism may, of course, be employed.

The main driving shaft 8 (Figs. 5 and 29) is provided with a pair of reversely-inclined beveled pinions 9 and 10, the former meshing with a similar pinion 11 mounted upon a shaft 12, the opposite end of said shaft carrying a beveled pinion 13, which meshes with a similar pinion 14, mounted upon a shaft 15. Said shaft 15 carries at its opposite end a beveled pinion 16 (see Figs. 4 and 29), said pinion meshing with a corresponding beveled pinion 17 carried by a shaft 18 which extends parallel with the shaft 12 upon the opposite side of the machine. Shaft 18 also carries a beveled pinion 19 which in turn meshes with the beveled pinion 10 mounted upon shaft 8 (see Fig. 5). These shafts 8, 12, 15 and 18 impart motion to the various portions of the apparatus through cams and connections, as will be hereinafter set forth in detail.

The bed 1 is provided in its upper face with two parallel longitudinally-disposed openings 20 and 21, in which work the form and box-carrying belts, in the former of which the wrapper is drawn about the cigarettes as they are placed thereon. The second belt serves to partially bend the slide to shape to receive the packaged cigarettes. The form belt, which works in the opening 20 and beneath the cigarette reservoir, comprises a series of solid blocks or members 22, each block having a series of upstanding fingers 23, three fingers being arranged upon each side of the block and the series being in parallelism. Blocks 22 are also provided with outwardly-projecting ears 24 and are connected to each other by links 25 and pivot-pins 26, which are passed through the ears and the overlapping ends of the links (see Fig. 16). The pins are extended outwardly beyond the links, their ends running in grooves or ways 26ᵃ formed in tracks or guides 26ᵇ, see Figs. 6, 7 and 10, the tracks extending along the major portion of each of the openings 20 and 21. Blocks 22 with the upstanding fingers 23 (the openings between which do not extend downward to the upper faces of the bottoms of the blocks, see Fig. 14) form in effect molds or receptacles in which the cigarettes are placed and wrapped. The chain thus produced passes over pocket sheaves 27 and 28, the former being mounted upon a shaft 29 (Fig. 5) and the latter upon a shaft 30 (Figs. 2 and 6). Shaft 30 carries at its outer end a disk or plate 31, provided with a series of radially-disposed slots 32, which work in conjunction with a stud or pin 33 carried upon the outer end of a crank or arm 34 secured to the shaft 15. This arrangement, as will be readily understood, imparts a step-by-step movement or travel to the endless belt or chain which serves to properly position the forms or boxes with reference to the other mechanisms.

The chain or belt which works in the opening 21 comprises a series of boxes or receptacles 35 (see Figs. 1, 4, 5, 7, 10 and 25) which are integral parts of the solid links 36, said links being connected together by intermediate spacing links 37 (Fig. 1), pivot-pins passing through the overlapping portions of the adjacent links and connecting the parts together. This chain or belt passes about pocket-sheaves 38 and 39, the former being mounted upon a shaft 40 (Figs. 4 and 5) and the latter upon a shaft 41 (Figs. 4 and 6). Shaft 40 carries at its outer end a slotted disk 42, which works in conjunction with a crank-arm 43 and a pin 44 carried thereby. The crank-arm is mounted upon shaft 8 and the parts are so arranged and timed that as the form belt upon the right of the machine moves from the head to the foot thereof the second, or box-carrying, belt moves the same distance in the opposite direction.

Arranged at the head of the machine and in line with the forward end of the form belt is a reservoir 45, provided with a movable belt 46 in the lower portion thereof, which belt serves to feed the cigarettes (designated by the numeral 47) forward into the chute or channel 48, the opening in said chute or channel being of a size sufficient to permit the cigarettes to pass down in a layer of but one in depth. The lower end of said chute or channel 48 extends outwardly in a horizontal direction and terminates in line with a receptacle or chamber 49, of a width sufficient to allow any desired number of cigarettes to pass into the same. In the form shown the chamber is capable of accommodating five cigarettes, the cigarettes resting at their ends upon wings or pivoted plates 50 (Fig. 17), said wings or plates being normally held in a horizontal position by a spring 51, connected with the crank-arms 52 attached to said wings. A second pair of plates or wings 53 is arranged in the chamber or receptacle 49 at a point slightly below the wings 50, being held in a horizontal position by a spring 54. Said plates or wings 53 are adapted to receive the lowermost layer of cigarettes. The five cigarettes which are thus accommodated in the chamber 49 are transferred from the wings 50 to wings 53 through the action of a plunger 55 which in its initial movement is forced downwardly to such an extent as to bear upon the cigarettes resting on the wings 50 and cause said wings to rock and permit the cigarettes to pass downwardly upon the wings 53, after which the plunger is moved upwardly, the wings 50 assuming their normal or horizontal position. Immediately the lower end of the plunger has cleared the mouth of the chute 48 another layer of five cigarettes will move inwardly upon the wings 50 into position to be acted upon by the plunger in its second descent, which will move the upper layer of cigarettes down onto the lower layer. The continued action of the plunger will move the ten cigarettes thus laid upon each other in two series of five each from the chamber 49 onto a combined paper and foil wrapper 56 which has been previously laid upon a table 57 immediately below the chamber 49. Said table 57 is provided with a central opening 58, the upper edges of which are slightly rounded in order that the wrapper may not be torn as the cigarettes and plunger move downwardly and carry the wrapper with them into the form on the chain immediately below it.

In order to effect a short stroke and a subsequently long stroke of the plunger 55 I employ a cam 59, of the form best shown in Fig. 2, said cam being mounted upon the driving shaft 8. Said shaft is also provided with a pulley 60, about which passes a belt 61, the belt at its upper end passing about a pulley 62, connected to the shaft 62ª of one of the rollers carrying belt 46.

Shaft 29 (Figs. 3 and 5) carries a belt-pulley 63, and a belt 64 extends therefrom and around a smaller pulley 65, mounted upon a shaft 66. Said shaft carries a roll 67 which works in conjunction with a second idler roll 68 to effect the feeding of the foil and paper or other wrapper from the supply roll 69 to the table 57. Inasmuch as motion is transmitted to these parts by the shaft 29, it will be seen that the wrapper is fed in over the table at the same time that the form belt is being moved one step.

In order to sever the wrapper from the stock a knife 70 is secured to one side of the plunger 55 or to the plunger-slide 71 and as the plunger makes its first or initial downward movement the wrapper is severed by said knife. The plunger-slide 71 works through a suitable support 72, secured to the bed of the machine, and the actuating rod 73 for the plunger also works through suitable guides.

As will be seen upon reference to Fig. 16, the wrapper is of a length somewhat greater than the length of the cigarettes and of a width sufficient to leave upstanding edges above the upper layer of cigarettes. It is designed first to fold in these upstanding edges and then to tuck in the ends and fold said tucked ends upwardly so as to completely inclose the cigarettes. The initial fold of the wrapper is effected by a series of fingers 74, which are attached to and project downwardly from a cross-bar or block 75. The lower ends of these fingers are curved or rounded, as clearly shown in Figs. 2 and 14, and are so spaced as to pass between the upstanding fingers 23 when the cross-bar or block 75 is moved downwardly. Said cross-bar is provided with pins or studs 76 (Fig. 3) at its outer ends, the pins or studs working in inclined slots 77 formed in check-pieces or plates 78 secured to the bed of the machine and to the vertically-disposed guiding and supporting member 79. Cross-bar 75 is pivotally connected to a slide 80 which is supported by the guide or supporting member 79, said slide 80 being normally held in an elevated position by a spring 81 interposed between the slide and a fixed portion of the machine. The slide is provided upon its rear face with a knee or shoe 82, which coacts with a similar member 83, carried by the plunger or plunger-slide 71. The members 82 and 83 stand in vertical alinement with each other, and as the plunger makes its second descent the member 83 comes into contact with member 82 and carries the slide 80 downwardly against the stress of the spring 81, causing the studs 76 to pass down the inclined slots, and by reason of the inclination of said slots to move the fingers 74 outwardly or between the fingers 23 and carry the adjacent upstanding edge of the wrapper over the uppermost layer of cigarettes. The position of the parts when the plunger is depressed to its full extent is shown in dotted lines in Fig. 14, wherein it will be seen that the fingers 74 have carried the upstanding edge of the wrapper inwardly over the cigarettes. In order to lay the other upstanding edge of the wrapper down upon the previously folded edge, a series of fixed folders 84 (four in number, see Figs. 1, 3 and 14) are arranged in the path of travel of the form belt, the innermost pair of folders passing between the upstanding fingers 23, while the outermost pair pass to the outside of the fingers, the curved under face of said folders gradually carrying the upstanding edge of the wrapper downwardly over the previously-folded portion as the belt is traversed one step or a distance equal to that which would transfer the package from beneath the plunger to a position where it would be acted upon by the folding fingers 74. When the upstanding edges have thus been folded the ends are tucked inward, as shown in Figs. 11, 13, 16 and 20. As will be seen upon reference more particularly to Fig. 16, two folders 85 are employed, said folders standing at substantially right angles to each other and being mounted in guides or ways 86 secured upon the upper face of the bed or table 1. Each folder is provided with a downwardly-projecting arm 87, to the lower end of which is pivotally secured a link 88, the inner ends of the links being connected to a slide 89 (see Fig. 13) mounted upon a suitable bracket or support 90 secured to the under face of the bed. Connected to the outer end of the slide 89 is a slotted arm 91 (Fig. 3), said arm being secured to one end of a rock-shaft 92 mounted in the lower end of a bracket 93, a similar slotted arm 94 being secured upon the opposite end of the rock-shaft and connected to a lug or ear 95 extending outwardly from a rod 96. Motion is imparted to said rod by a cam 97 mounted upon the shaft 12. The cam is so timed as to move the folders 85 inwardly against the forward end of the wrapper when the form-carrier or chain has come to rest with a package directly in alinement with the inner ends of said folders. To effect the second end fold or tuck of the wrapper a pair of fixed folders 98 (Fig. 16) is used. These folders stand in direct alinement with the projecting ends of the wrapper and are curved inwardly so as to gradually fold or tuck the ends of the wrapper against the ends of the cigarettes as the chain or form-carrier moves the package between said folders.

In order to turn down the projecting upper ends of the wrapper and to thereafter fold up the lower projecting ends of the same, fixed folders 99, of the form best shown in Figs. 2, 16, 18, 19, 30 and 31 are employed. As will be seen upon reference to Figs. 18 and 30, the fixed folders 99 are provided with curved faces 99$^a$ which bear against the outwardly-projecting ends of the upper portion of the wrapper and as the form-carrier is moved along tend to gradually fold the ends downward against the intucked portions of the wrapper, the curved line extending to a point adjacent to the lower edge of the package, so as to completely turn said projecting ends downward previous to the reversely-curved portion 100 coming into action to effect the upward turning of the lower portion of the wrapper.

To properly hold the package in position within the form and to prevent dislodgment of the upper portion of the wrapper, fixed bars 101 are secured in line with the spaces between fingers 23, said bars being supported from the under face of a hopper 102, or in any other suitable manner. As will be seen upon reference to Fig. 2, the forward ends of these bars 101 are curved so that the package may readily pass thereunder without displacing the wrapper in any manner.

Instead of employing fixed folders 98 for forming the second end tuck, a second pair of endwise movable folders, such as shown in Fig. 28, may be employed, the folders being operated in any suitable manner, as for instance through connections substantially such as those shown in conjunction with folders 85.

Arranged above the final folding mechanism just referred to is the card-holding hopper 102. As will be seen upon reference to Fig. 2, the cards are placed on edge and pressed forwardly toward the discharge outlet 103 of the hopper by a spring-pressed follower 104. A slide or plunger 105 of a thickness sufficient to project one card from the hopper moves through the discharge outlet 103 and serves to carry one card outwardly therefrom, the card dropping upon the upper face of the package and lying flat thereon, see card 106 shown in Fig. 16. The plunger 105 is actuated by the rod 96, being connected to the upper end thereof, as shown in Figs. 1, 3 and 11. After the package has thus been completely formed and the card placed thereon, it stands in alinement with a way or channel 107, through which it is moved to the transfer belt or the box-slide previously placed upon said belt. This transfer of the package is effected through the operation of a shoe or pusher 108, pivotally secured at its upper end in a block or slide 109 mounted and movable upon a guide or rail 110. The block 109 is actuated through the medium of an arm 111 connected to said block by a link 112. Arm 111 is secured upon the upper end of a rock-shaft 113, said rock-shaft being formed or provided with an outwardly-extending arm or lug 114, the outer end of which coacts with a cam 115, best shown in Figs. 6 and 29. The cam is so timed as to bring the shoe or transfer mechanism into action when the two belts or carriers are at rest.

Previous to the transfer of the wrapped package, it is designed that the box-slide shall have been placed in the box-carrying belt or chain. A magazine or hopper 116 (see Figs. 1, 7 and 9) is secured to one side of the frame of the machine, and a spring-pressed plunger 117 serves to move the box-slides 118 upwardly therein into a position where they may be fed forward one at a time, preparatory to being forced down into one of the forms 35. Said box-slides are of the form best shown in Fig. 8, each being provided with two side wings 119, a short combined end piece and top fold 120, and a relatively long combined end piece and top fold 121. The slides are fed upwardly in the hopper while in a flat condition and pass outwardly therefrom one at a time beneath a finger or plate 122, onto a table 123 and under a plunger 124, said plunger standing over an opening 125 formed in the table 123 directly above one of the forms 35. To effect a feeding or downward movement of the box-slides one at a time I provide a slide 126, carrying toothed members 127, said members being pivotally connected to the slide 126 at one end, the teeth resting upon the wings 119 of the box-slide and serving to move the same forward as the slide 126 is advanced along the guide-rail 128. Slide 126 is connected with an arm 129 through a link 130, the arm being secured to the upper end of a rock-shaft 131 (Figs. 4 and 11), said shaft being provided with an outwardly-projecting arm or finger 132 which coacts with a cam 133. This cam comes into operation to move arm 129 and consequently the slide 126 at the time the box-carrying belt is about to come to rest, or as it has just ceased its movement. The box-slide 118 which is thus carried beneath the plunger and over the form 35 passes through the opening in the table 123, down into the form 35, through the action of the plunger. Said plunger, as will be seen upon reference to Figs. 1, 2, 3 and 4, is connected to the upper laterally-extending end of a sliding bar 134, the lower projecting end of which coacts with a cam 135 secured upon shaft 15. The cam 135 brings the plunger into action immediately after one of the box-slides has been placed over the opening 125 and carries the same into the form 35, folding up the side wings 119 and partially turning up the short end 120, see Fig. 10. After the plunger is withdrawn, the box-carrying chain or belt is moved forward one step, the partially-upturned end 120 coming against the curved former or folder 136, whereby it is turned inward into the position shown in Fig. 24. At the same time, the longer end 121 passes in between the outwardly flared ends 137 of plates 138, the main body portion of said plates being slightly separated and underlying the transfer channel 107. The projecting end 121 of the box-slide is thus held in such position that the wrapped package of cigarettes may be moved into the partially-formed box-slide without danger of the foil or wrapper being injured or disarranged, the package passing off the end of the transfer channel 107 directly into the partially-folded box-slide. The upstanding walls 119 of said slide will, by reason of the inherent spring of the slide, lie in close proximity to the vertical walls of the form 35 and consequently their ends will not project into the path of the incoming package. The package is of a width less than that of the box-slide, sufficient space being left for the purpose of introducing mouthpieces into the slides to the side of the packaged cigarettes. After the cigarettes have been placed in the box-slide, as just noted, the box-carrying chain or belt is moved forward one step, at which time the form-belt or chain is likewise moved one step in the opposite direction, thereby bringing a new package into alinement with the transfer channel 107. It will be understood, of course, that a new box-slide will have been moved out of the hopper 116 and placed in the form 35 in line therewith, so that the partially-folded slide will stand in direct alinement with the transfer channel 107 ready to receive the next package of cigarettes which may be moved over thereto by the transfer mechanism above described. As the box-slide with the packaged cigarettes is moved one step forward away from the mouth of the transfer channel 107 it comes into direct alinement with the discharge opening 139 of a mouth-piece hopper 140, said hopper being connected to said discharge opening by an inclined way or channel 141 down which the nested mouth-pieces may pass in a single layer. An endless belt 142 is placed in the lower portion of the hopper 140, constant motion being imparted to said belt by means of a belt 143 (Fig. 1) which passes over a pulley secured to one end of one of the rollers about which said belt 142 passes, and to a second roller 144 mounted upon the outwardly-projecting end of shaft 62ª.

Extending into the discharge opening 139 is a spring-sustained finger or gate 145, said finger being so positioned that two layers of the nested mouth-pieces stand in said opening in direct alinement with a plunger 146 so that as said plunger is moved downwardly through the action of a cam 147 and connecting rod 148 two series of mouth-pieces, or ten in all, will be carried downwardly by the plunger, throwing the spring-sustained finger or gate 145 outwardly and placing the mouth-pieces in the box-slide with the packaged cigarettes (see Fig. 25). Inasmuch as the plunger is solid the mouth-pieces in the way or channel 141 will be held in place until the lower end of the plunger has entirely cleared said channel, previous to which, however, the spring-sustained finger 145 will be swung inwardly into position to prevent the mouth-pieces from moving outwardly through the discharge opening 139. After the mouth-pieces have been placed in the package and the box-carrying belt or chain is given its next step forward, the long or projecting end 121 of the box-slide rides over and into contact with a fixed folder 149, said folder being of the form best shown in Figs. 1, 21, 22 and 23. This folder first serves to give the projecting end an upward turn and then to fold the outer end over the packaged cigarettes (see Fig. 22), the folder being formed with an inwardly-extending portion 150 which causes the projecting end to be turned down over the cigarettes. When the long end of the slide has thus been turned in, the completely folded box-slide with its contents is brought into alinement with a way or channel 151, in which the opened shucks are held. The shucks are placed in the machine in a collapsed condition, being fed from a hopper 152, secured to one side of the bed or table. They are moved outwardly from the lower end of the hopper into line with a slide 153 by a plunger 154, said slide and plunger moving at right angles to each other. Plunger 154, which works across the lower end of the hopper 152, is provided with a downwardly-projecting arm 155 to which is connected a spring 156, said spring tending at all times to draw the plunger across the end of the hopper. The slide 153 is likewise provided with a downwardly-extending arm 157 to which is pivotally connected a link 158, attached at its opposite end to a crank-arm 159 secured to or extending from rock-shaft 131, see Fig. 4. The plunger 154 bears against one end of the lowermost shuck or cover and as the cam 133 which actuates the rock-shaft 131 is rotated said shuck is moved outward into line with the forward end of the slide 153. The inner end of the shuck does not quite clear the lower edge of the hopper, and as the slide moves forwardly, after the plunger is retracted, the shuck is held in its closed position while it is being moved away from the hopper through an opening 162 formed in the frame of the machine adjacent to the lower end of the hopper and into the way or channel 151. Said way or channel, as will be seen upon reference to Fig. 26, is provided with inwardly-projecting lips 163 at its upper edge.

In order to square the shucks and to completely open the same, a finger 164, pivoted at its midlength upon a pin 165, is mounted upon the outer side of the way or channel 151, the lower end of the finger being thrown inwardly into the channel by a spring 166. Inasmuch as the opening 162 is in line with the lower portion of the channel 151, the forward lower edge of the side of the box-cover or shuck will strike said pivoted finger 164, and upon the further movement of slide 153 the shuck will be squared or opened, assuming the dotted line position shown in Fig. 26, at which time the finger 164 will be thrown upwardly into a vertical position and the spring 166 placed under tension. The box-cover or shuck is prevented from again collapsing by reason of the fact that it fits beneath the lips 163. The shuck thus opened will be held in position ready to receive a box-slide and its contents. After the long end of the box-slide has been turned inwardly over the package, as above noted, the box-carrying chain or conveyer is given a forward movement so as to bring one of the completed packages into line with the channel 151. A shoe 167 (Figs. 1, 4 and 11) having an outwardly-projecting toe 168 is employed for transferring the filled box-slide into the shuck. Said shoe 167 is secured to a block 169, which in turn is mounted upon a rod 170, motion being imparted to said block through an arm 171, connected to the block by a link 172. Said arm 171 is connected to the upper end of a rock-shaft 173, to which motion is imparted by a cam 174 acting upon a finger 175, secured to or formed as a part of the rock-shaft 173. As the shoe is moved inwardly over the box-slide the projecting toe or piece 168 bears directly upon the upper face of the box-slide and presses the same downwardly upon the packaged cigarettes. A continued movement of the shoe carries the slide and its contents into the shuck or opening and said shuck with the slide therein pass to a point remote from the opening 162 so that another shuck may be moved outwardly into the way or channel 151, after the shoe is moved backwardly to the right, or into the position shown in Fig. 1.

From the foregoing description it will be seen that the machine is entirely automatic in its operation, it being necessary only that the attendant replenish the contents of the various hoppers as required and maintain the supply of wrapper material.

By causing the form-carrying belt or chain and the box-carrying belt to move in opposite directions and providing a transfer mechanism for conveying the package from the form-belt or carrier to the box-carrying belt the machine may be made relatively compact, thus occupying but little floor-space.

It is conceivable that, so far as the generic invention is concerned, various forms of the specific devices used in the machine may be employed.

While the machine as shown is designed especially for packaging cigarettes, it is to be understood that the mechanism may be used for handling other goods.

The machine may be employed to package the cigarettes without the mouth-pieces, in which event the pockets in the box-carrying belt will be blocked to make them smaller, or a new chain with smaller pockets may be substituted.

Having thus described my invention, what I claim is:

1. In an organized machine for packaging cigarettes, the combination of a form-carrier; means for moving the same; a cigarette hopper; means for placing a wrapper over the form immediately below the hopper; means for withdrawing a predetermined number of cigarettes and carrying the same with the wrapper down into the form; means for completely folding the wrapper about the cigarettes; means for placing a card upon the bundle thus formed; a box-carrier; means for placing box-slides therein; means for transferring the bundle and card to a box-slide; means for placing a series of mouth-pieces in the slide alongside the bundle; means for closing the slide about its contents; and means for transferring the slide and its contents into an opened shuck.

2. In an organized machine for packaging cigarettes, the combination of a form-carrier; means for moving the same step by step; a hopper for the cigarettes; means for placing a wrapper over the form immediately below the hopper; means for withdrawing a predetermined number of cigarettes and carrying the same with the wrapper down into the form; means for completely folding the wrapper about the cigarettes; means for placing a card upon the bundle thus formed; a box-carrier; means for placing box-slides therein; means for transferring the bundle and card to a box-slide; means for placing a series of mouth-pieces in the slide alongside the bundle; means for closing the slide about its contents; a magazine for containing collapsed shucks; means for withdrawing the shucks therefrom and opening the same; and means for transferring the closed slide and its contents into an opened shuck.

3. In a machine for packaging cigarettes, the combination of a form-carrier; means for moving the same step by step; a hopper for the cigarettes; a plunger working across the mouth of the hopper; a yielding support mounted in line with the lower end of the mouth of the hopper; a second yielding support located in a plane below said first support; and means to impart to the plunger two strokes of varying lengths, the first serving to withdraw a number of cigarettes and to carry them downwardly upon the lower support, while the second stroke or movement of the plunger carries a second tier or layer of cigarettes down upon the first layer and places both layers in a form.

4. In a machine for packaging cigarettes, the combination of a form-carrier; means for imparting a step-by-step motion thereto; a hopper for the cigarettes; a receptacle or chamber located in line with the mouth of the hopper; a yielding support extending into said chamber in line with the lower portion of the mouth of the hopper; a second yielding support located in said chamber in a plane below the first support; means for sustaining a wrapper below said chamber; a plunger working through said chamber and past the mouth of the hopper; and means for imparting a variable double stroke to the plunger whereby a layer of cigarettes will be first passed from the upper to the lower support and upon the second movement of the plunger a second layer will be carried downward upon the first layer, both layers being placed upon the wrapper and the wrapper with the cigarettes thereon forced into a form.

5. In a machine for packaging cigarettes, the combination of a form-carrier; means for imparting a step-by-step motion thereto; a cigarette hopper; a chamber mounted in line with the discharge opening of said hopper; a yielding support extending inwardly into said chamber in line with the discharge opening of the hopper; a second yielding support located in said chamber in a plane below said first support; a table mounted below said chamber, said table being provided with an opening which stands in direct alinement with the form below the same; means for placing a wrapper upon said table; a plunger working through the chamber; and means for imparting a variable double stroke to said plunger, whereby said plunger will first carry a layer of cigarettes from the upper to the lower support, and upon its second or full movement will carry a second layer down upon the first layer and then move both layers downward upon the wrapper, placing said wrapper with the cigarettes thereon in the form immediately below the opening in the table.

6. In a machine for packaging cigarettes, the combination of a form-carrier; means for imparting a step-by-step motion thereto; a hopper for the cigarettes; means for withdrawing cigarettes from the hopper and carrying the same, together with a previously-positioned wrapper, down into a form immediately below the discharge end of the hopper; and means coacting with the means for placing the cigarettes and wrapper in the form to fold down one of the upstanding edges of the previously-placed wrapper.

7. In a machine for packaging cigarettes, the combination of a form-carrier; means for imparting a step-by-step motion thereto; a plunger serving to place cigarettes and a previously-positioned wrapper in a form; and a folder actuated by the plunger; said folder moving against and over one of the upstanding edges of the wrapper in the form which has been advanced from beneath the plunger, substantially as described.

8. In a machine for packaging cigarettes, the combination of a form-carrier; means for imparting a step-by-step motion thereto; a hopper for the cigarettes; a plunger serving to withdraw cigarettes from the mouth of the hopper and to place them, together with a previously-positioned wrapper, in a form immediately below the discharge end of the hopper; a folder for one of the upstanding edges of the wrapper placed in the form which has been advanced from beneath the plunger, said folder having a downward and outward movement; and connections intermediate said folder and the plunger for actuating the folder, substantially as described.

9. In a machine for packaging cigarettes, the combination of a form-carrier; means for imparting a step-by-step motion thereto; a hopper for the cigarettes; a plunger movable across the mouth of the hopper and having a double variable stroke; means for placing a wrapper in line with the plunger and above the form immediately below the same; a folder for one of the upstanding edges of the wrapper placed in the form advanced from beneath the plunger, said folder comprising a series of fingers rounded upon their lower ends and connected to a cross-bar; a slide; a pivotal connection between said slide and the cross-bar; and means for actuating said slide when the plunger is moved downward to its full extent.

10. In a machine for packaging cigarettes, the combination of a form-carrier; a series of forms mounted thereon, each of said forms comprising an open-ended receptacle having a series of upstanding fingers upon its opposite sides; means for placing a series of cigarettes, together with a previously-positioned wrapper, in a form; a folder for one of the upstanding sides of the wrapper, said folder comprising a series of fingers adapted and arranged to pass between the fingers of the form; means for imparting a downward and forward movement to said folder; a series of fixed folders arranged in line with the upper face of the package, said folders being separated and passing inwardly between the fingers of the form; end tuckers; folders for the outwardly-projecting ends of the wrapper; and a series of separated bars arranged in alinement with the end folders, said bars normally resting upon the upper face of the package and serving to prevent disarrangement of the wrapper as the end folders come into action.

11. In a machine for packaging cigarettes, the combination of means for wrapping a predetermined number of cigarettes; a box-carrier; means for placing a box-slide in said carrier; means for embracing one end of the slide; means for placing the packaged cigarettes in the slide, said means serving to move the package over the embraced end, whereby the wrapper may be moved into the slide without coming into contact with the projecting end of the slide; means for closing said slide about its contents; and means for moving said slide and its contents into a previously-opened shuck.

12. In a machine for packaging cigarettes, the combination of means for wrapping a predetermined number of cigarettes; a box-carrier; a table provided with an opening located above the carrier; means for forcing a box-slide down through the opening and into the carrier, whereby the sides of the slide will be turned upward against the upstanding walls of the box-carrier; means for advancing the box-carrier with the slide therein; means for embracing the projecting end of said slide; means for transferring the packaged cigarettes into the slide while it is thus positioned; means for placing a series of nested mouth-pieces in the slide alongside the packaged cigarettes; means for folding the slide about its contents; and means for transferring the slide from the carrier into a previously-opened shuck.

13. In a machine for packaging cigarettes, the combination of means for wrapping a predetermined number of cigarettes; a box-carrier; means for imparting a step-by-step motion thereto; a hopper for containing box-slides; a table extending from said hopper over the box-carrier, said table being provided with an opening in line with the carrier; means for advancing the slides one at a time along said table and over the opening therein; a plunger serving to carry the slides downward through said opening and into the carrier immediately below the same, whereby the sides of the slides will be turned upwardly; a pair of fixed plates provided with outwardly-flared ends, said plates standing in line with the outwardly-projecting long end of each slide; a transfer channel located above said plates; means for advancing the wrapped package of cigarettes through said channel and into a box-slide; means for folding the slide about its contents; and means for removing the slide and its contents from the box-carrier into a previously-opened shuck.

14. In a machine for packaging cigarettes, the combination of means for wrapping a predetermined number of cigarettes; a box-carrier; means for imparting a step-by-step motion thereto; a hopper for holding a series of box-slides in a flattened condition; a table extending from said hopper over the box-carrier, said table being provided with an opening in line with the carrier; means for advancing the slides along said table one by one and placing the same over the opening therein; a plunger serving to carry the slides through the opening and into the carrier below the same; a transfer channel; a pair of fixed plates located below said transfer channel and having outwardly-flared ends standing in line with the outwardly-projecting end of each box-slide; means for transferring the packaged cigarettes through said channel and into a box-slide while the projecting end thereof is confined between the plates; a hopper for the mouth-pieces; means for withdrawing a double tier of nested mouth-pieces from said hopper and placing them in the slide alongside the wrapped cigarettes; means for folding the slide about its contents; a magazine for holding collapsed shucks; means for withdrawing the shucks therefrom one by one; means for opening said shucks; and a transfer device serving to remove the slide and its contents from the box-carrier and placing the same in an opened shuck.

15. In a machine for packaging cigarettes, the combination of means for wrapping a predetermined number of cigarettes; a box-carrier; means for imparting a step-by-step motion thereto; a hopper for the flattened box-slides; a table extending from said hopper over the box-carrier, said table being provided with an opening in line with the carrier; means for advancing the slides one by one along said table and placing the same over the opening therein; a plunger serving to carry the slides downward through the opening and into the carrier beneath the same; a transfer channel; a pair of fixed plates located below the channel, said plates serving to embrace the outwardly-extending ends of the slides; a hopper for the nested mouth-pieces; means for placing a double layer of said mouth-pieces in each slide alongside the package; means for folding the slide about its contents; a hopper for collapsed shucks; a slide for removing the shucks from the hopper one by one; a way or channel located adjacent to one side of the shuck hopper; means for opening the shucks within said channel; and a transfer device serving to move said slide and its contents through said channel and into an opened shuck, substantially as described.

16. In an organized machine for packaging materials, the combination of an endless form-carrying belt; means acting in conjunction with the forms to wrap or envelop the material; an endless box-carrying belt, said belts being arranged side by side; means for traversing said belts in opposite directions; and means for transferring the formed and wrapped package from the form-belt to a box upon the box-carrying belt.

In testimony whereof I have signed my name to this specification in the presence of two subscribing witnesses.

JAMES H. HOWARD.

Witnesses:
S. W. SPORGER,
J. N. CHEEK.